June 29, 1965
R. K. BRODERSEN
3,192,393
OPTICAL PHASE SENSITIVE INCREMENTAL ENCODER
Filed Jan. 17, 1962
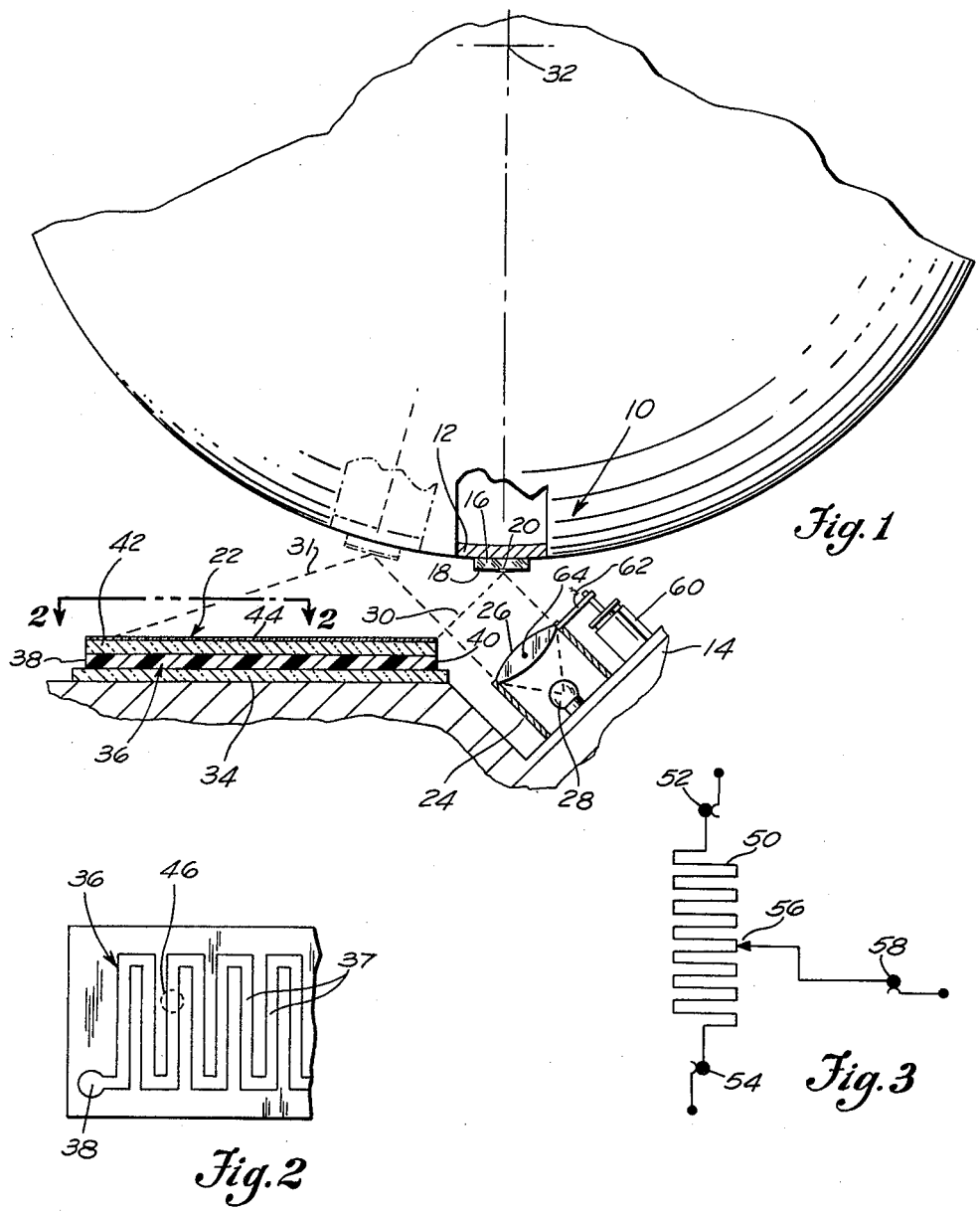
ROLF K. BRODERSEN
INVENTOR.
BY S. A. Giarratana
ATTORNEYS United States Patent Office 3,192,393
Patented June 29, 1965

3,192,393
OPTICAL PHASE SENSITIVE INCREMENTAL
ENCODER
Rolf K. Brodersen, Orange, N.J., assignor to General
Precision Inc., Little Falls, N.J., a corporation of
Delaware
Filed Jan. 17, 1962, Ser. No. 166,792
7 Claims. (Cl. 250—235)

The present invention relates to an apparatus for developing phase sensitive incremental digital outputs, and more particularly to an apparatus employing an electro-optical potentiometer to indicate relative movement between inner and outer gimbals of a gyro.

Prior to the present invention, electro-optical potentiometers were employed for measuring relative displacement between two members. These devices consist of a light source, lens and baffle and a light-sensitive resistor, all mounted on one of the members, plus a mirror and mask mounted on the other member. The light-sensitive resistor is of the micro-module type in order to give the highest possible resolution in the smallest possible size. It consists of a deposited resistor film strip in a pattern which provides large incremental resistance changes for incremental deflections of the light beam from the light source. The resistor film strip is covered with a photo-resistive layer on top of which is placed an electrically conductive transparent layer. The light beam is deflected by the mirror and mask on the one member to a spot on the light-sensitive resistor where the impinging light essentially short-circuits the photo-resistive layer to establish a certain resistance value between the conductive transparent layer and either of the two terminals of the resistor film strip. By the selection of the appropriate pattern for the deposited resistor film strip, large incremental resistance changes are made available as the light beam moves across the resistor which can be converted into a voltage pulse output by use of a simple RC network.

These prior devices required the use of special micromodule type resistors in a pattern providing large incremental resistance changes for incremental deflection of the light beam, and the light beam had to be extremely narrow and sharply defined in order to create sharp step outputs with minimum rise or decay time even for slow deflection of the light beam. The present invention improves upon these prior devices by providing a dither-type motion of the light beam, forcing it to move quickly back and forth between two adjacent parts of the resistor film strip with adequate speed even during time periods when there is no relative motion between the two members. The time average of the output then provides a better approximation of the actual movement measured between the two members as compared with the output without the dither.

Accordingly, it is one object of the invention to provide a phase sensitive incremental digital encoder for measuring relative movement or displacement between two members with extreme accuracy and resolution.

It is another object of the invention to provide an optical incremental encoder using a light-sensitive resistor having a light beam impinging thereon and acting as a pot wiper arm of a rheostat wherein the light beam is dithered to provide an improved output signal.

It is a further object of the invention to provide a phase sensitive optical incremental encoder of the type described above which is simple in construction, effective and accurate in use, and economical to manufacture.

Other objects and advantages of the present invention will be specifically pointed out or will otherwise become apparent when referring, for a better understanding of the invention, to the following description in conjunction with the accompanying drawings, wherein:

FIG. 1 is a plan view of one embodiment of the invention;

FIG. 2 is a view taken on the line 2—2 of FIG. 1; and

FIG. 3 is a diagram illustrating the electrical equivalent of the present invention.

Referring to the drawing, an optical incremental encoder 10 embodying features of the invention is illustrated in combination with inner and outer gimbals 12 and 14 of a gyro for measuring the relative angular movement therebetween. The optical encoder comprises a mirror 16 mounted on the inner gimbal 12 and having a mask 18 covering the exposed face thereof with a small aperture therein as at 20. A light-sensitive resistor 22 is mounted on the outer gimbal 14 along with a baffle 24 having the open end thereof covered by a lens 26 and a light source 28 positioned therein. The lens 26 focuses the light from the light source into a straight beam of light having a cross-sectional area substantially equal to the cross-sectional area of the lens. With the gimbals in the position illustrated, a small pinpoint beam 30 is reflected by the face of the mirror 18 exposed at the aperture 20 in the mask 18 onto the right edge of the light-sensitive resistor 22. The reflected pinpoint beam will pass over the face of the light-sensitive resistor 22 as the inner gimbal 12 pivots about the axis 32 to the phantom position illustrated, at which point a reflected pinpoint beam 31 will impinge on a spot near the left side of the resistor 22.

The light-sensitive resistor 22 comprises a base insulating layer 34 having a resistor film strip 36 with output terminals 38 and 40 deposited thereon in the rectangular step pattern illustrated in FIG. 2 with the parallel spaced legs or convolutions 37. A photo-resistive layer 42 covers the resistor film strip 36 to normally provide an insulating layer thereabove when not exposed to light, and a transparent electrically conductive layer 44 covers the photo-resistive layer 42. The photo-resistive layer 42 is made of any of the well-known materials that are non-conducting until exposed to light. With this construction, a suitable voltage can be applied across the terminals 38 and 40 of the resistor film strip 36 to provide a voltage drop across the strip and an electrical connection can be made to the electrically conductive layer 44 which is insulated from the resistor film strip 36 in the absence of light. However, when the reflected pinpoint beam impinges on a particular spot on the electrically conductive layer 44, such as the spot 46 illustrated in dotted lines in FIG. 2, for example, the photo-resistive layer 42 is essentially short-circuited at this spot to establish a certain resistance value between the conducting layer 44 and either of the terminals 38 and 40 of the resistor film strip 36. Therefore as the spot 46 at which the reflected pinpoint beam impinges on the layer 44 moves across the spaced legs 37 of the resistor film strip 36 in response to the angular movement of the gimbal 12, it acts as a pot wiper arm to make available step voltage output increments which can be converted into voltage pulse output by a simple RC network. The electrical equivalent of this is illustrated in FIG. 3 wherein a resistor 50 with output terminals 52 and 54 is slidably engaged by a conventional pot wiper arm 56 connected to a terminal 58.

In order to maintain the size of the unit described above as small as possible for gyro applications and still maintain satisfactory resolution, a special micro-module type resistor in a pattern which provides large incremental resistance changes for incremental deflection of the light beam must be employed. In addition the light beam has to be extremely narrow and sharply defined in order to create sharp step outputs with minimum rise or decay time for slow deflection of the light beam from one leg 37 of the resistor film strip 36 to the other. In accordance with the present invention, these problems are minimized and the resolution of the above construction improved by adding a dither-type motion of the light beam forcing it to move quickly back and forth a distance equal to the spacing between two adjacent legs 37 of the resistor film strip. It has been found that the time average of the dithered voltage output provides a better approximation of the actual angle measured than the previous output without dithering.

The dither-type motion can be created by providing controlled vibration of any one part of the optical arrangement. In the particular embodiment illustrated in FIG. 1, this controlled vibration is provided by an electromechanical vibrator 60 mounted on the gimbal 14 and connected to an arm 62 extending outwardly from one edge of the lens 26. The lens is mounted on the baffle 24 for pivotal movement about an axis 64 passing through the center lens perpendicular to the plane of the drawing so that the controlled vibrations provided by the vibrator 60 will reciprocate the reflected beam back and forth a distance equal to the distance between the two vertical legs 37 of the resistor film strip 36. This dithering movement is maintained continuously, even during time periods when there is no relative movement between the gimbals 12 and 14 so that a time average output is available at all times to indicate the angle between the gimbals.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An optical encoder comprising a pair of members movable relative to one another, light-sensitive resistor means mounted on one of said members, reflecting means mounted on the other of said members, light beam producing means mounted on said one member for directing a beam of light onto said reflecting means a portion of which is reflected to impinge on said light-sensitive resistor means at a spot thereon, relative movement between said members moving said spot across said light-sensitive resistor to vary the resistance thereof, and dithering means for dithering one of the aforementioned means mounted on said members to move said spot back and forth between two adjacent portions on said light-sensitive resistor means.

2. An optical encoder according to claim 1 wherein said dithering means comprises means for dithering said light beam producing means.

3. An optical encoder according to claim 1 wherein said light-sensitive resistor means comprises a base layer, a resistor film strip on said base layer in a pattern which provides large incremental resistance changes for incremental deflection of the light beam spot thereon, a photoresistive layer on said resistor film strip, and a transparent electrically conductive layer on said resistor film strip, said reflected light impinging on said electrically conductive layer.

4. An optical encoder according to claim 1 wherein said light-sensitive resistor means consists of a strip of resistor material disposed with a series of regular convolutions extending transversely of the path of said relative movement and dithering of said spot by said dithering means is between adjacent convolutions.

5. An optical encoder for measuring the angular displacement of an inner gimbal relative to an outer gimbal of a gyro comprising an outer gimbal, an inner gimbal pivotally mounted on said outer gimbal, a mirror mounted on said inner gimbal, a mask covering said mirror and having an aperture therein exposing a portion thereof, light-sensitive resistor means mounted on said outer gimbal comprising a base insulating layer, a resistor film strip on said base layer, a photo-resistive layer on said resistor film strip and a transparent conducting layer on said photo-resistive layer, a light source mounted on said outer gimbal, and means for directing the light from said light source as a beam onto said mirror so that a part thereof is reflected by the portion of the mirror exposed by said aperture onto said transparent conducting layer to form a sharp well-defined light beam spot thereon.

6. An optical encoder for measuring the angular displacement of an inner gimbal relative to an outer gimbal of a gyro comprising an outer gimbal, an inner gimbal pivotally mounted on said outer gimbal, a mirror mounted on said inner gimbal, a mask covering said mirror and having an aperture therein exposing a portion thereof, light-sensitive resistor means mounted on said outer gimbal comprising a base insulating layer, a resistor film strip on said base layer, a photo-resistive layer on said resistor film strip and a transparent conducting layer on said photo-resistive layer, a light source mounted on said outer gimbal, means for directing the light from said light source as a beam onto said mirror so that a part thereof is reflected by the portion of the mirror exposed by said aperture onto said transparent conducting layer to form a sharp well-defined light beam spot thereon, and means for dithering said light beam spot relative to said light-sensitive resistor means.

7. A optical encoder according to claim 6 wherein said resistor film strip is formed into a pattern having a plurality of parallel spaced apart legs interconnected at opposite ends to provide a continuous resistor, and said dithering means dithers said light beam spot back and forth a distance equal to the spacing between said legs, said inner and outer gimbals being oriented so that the movement therebetween moves the light beam spot transversely across said legs of the resistor film strip.

References Cited by the Examiner

UNITED STATES PATENTS

| | | | |
|---|---|---|---|
| 1,514,123 | 11/24 | Bacevicz | 250—230 |
| 2,609,513 | 9/52 | Boucher | 250—224 |
| 2,896,086 | 7/59 | Wunderman | 250—211 |
| 3,016,464 | 1/62 | Bailey | 250—224 X |

RALPH G. NILSON, *Primary Examiner.*

ARCHIE BORCHELT, *Examiner.*